(12) United States Patent
Flajslik et al.

(10) Patent No.: US 10,389,636 B2
(45) Date of Patent: Aug. 20, 2019

(54) TECHNOLOGIES FOR ADAPTIVE ROUTING USING NETWORK TRAFFIC CHARACTERIZATION

(71) Applicant: Intel Corporation, Santa Clara, CA (US)

(72) Inventors: Mario Flajslik, Hudson, MA (US);
Eric R. Borch, Fort Collins, CO (US);
Michael A. Parker, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 15/200,449

(22) Filed: Jul. 1, 2016

(65) Prior Publication Data

US 2018/0006946 A1   Jan. 4, 2018

(51) Int. Cl.

| | | |
|---|---|---|
| *H04L 12/801* | (2013.01) | |
| *H04L 12/26* | (2006.01) | |
| *H04L 12/935* | (2013.01) | |
| *H04L 12/931* | (2013.01) | |
| *H04L 12/947* | (2013.01) | |

(52) U.S. Cl.
CPC .......... *H04L 47/12* (2013.01); *H04L 43/062* (2013.01); *H04L 43/08* (2013.01); *H04L 43/16* (2013.01); *H04L 49/25* (2013.01); *H04L 49/3027* (2013.01); *H04L 49/50* (2013.01)

(58) Field of Classification Search
CPC ......... H04L 45/00; H04L 45/02; H04L 45/06; H04L 45/12; H04L 47/11; H04L 47/10; H04L 47/12; H04L 43/16; H04L 43/08; H04L 43/062; H04L 49/25; H04L 49/50; H04L 49/3027
See application file for complete search history.

(56) References Cited

U.S. PATENT DOCUMENTS

| | | | |
|---|---|---|---|
| 6,021,115 A * | 2/2000 | Simpson | H04L 12/5601 370/235 |
| 6,335,930 B1 * | 1/2002 | Lee | H04L 49/101 370/387 |
| 7,633,940 B1 | 12/2009 | Singh et al. | |

(Continued)

OTHER PUBLICATIONS

International search report for PCT application No. PCT/US2017/035456, dated Sep. 12, 2017 (3 pages).

(Continued)

*Primary Examiner* — Will W Lin
(74) *Attorney, Agent, or Firm* — Barnes & Thornburg LLP

(57) ABSTRACT

Technologies for adaptive routing based on network traffic pattern characterization include a network switch configured to receive a network packet via one of a plurality of input ports and identify a set of the plurality of output ports associated with a path usable to forward the received network packet to a destination computing device along. The network switch is further configured to adjust a total congestion value for each of the set of output ports based on a type of the path to which each of the set of output ports corresponds and a value of a minimal path counter to which each of the set of output ports corresponds and enqueue the received network packet into an output buffer queue of one of the set of output ports based on the total congestion value. Other embodiments are described herein.

25 Claims, 5 Drawing Sheets

(56) References Cited

U.S. PATENT DOCUMENTS

| | | | |
|---|---|---|---|
| 8,730,965 B2* | 5/2014 | Abts | H04L 45/06 370/392 |
| 9,648,148 B2* | 5/2017 | Rimmer | H04L 69/22 |
| 2007/0121499 A1* | 5/2007 | Pal | H04L 45/60 370/230 |
| 2012/0144065 A1* | 6/2012 | Parker | G06F 15/17362 709/241 |
| 2012/0170582 A1* | 7/2012 | Abts | H04L 45/06 370/392 |
| 2014/0140212 A1* | 5/2014 | Morandin | H04L 49/505 370/235 |
| 2014/0140341 A1 | 5/2014 | Bataineh et al. | |

OTHER PUBLICATIONS

Written opinion for PCT application No. PCT/US2017/035456, dated Sep. 12, 2017 (8 pages).
Pablo Fuentes et al., "Contention-based Nonminimal Adaptive Routing in High-radix Networks," IPDPS 2005, May 2015, IEEE.

\* cited by examiner

TECHNOLOGIES FOR ADAPTIVE ROUTING USING NETWORK TRAFFIC CHARACTERIZATION

GOVERNMENT RIGHTS CLAUSE

This invention was made with Government support under contract number H98230A-13-D-0124-0167 awarded by the Department of Defense. The Government has certain rights in this invention.

BACKGROUND

Modern computing devices have become ubiquitous tools for personal, business, and social uses. As such, many modern computing devices are capable of connecting to various data networks, including the Internet and corporate intranets, to transmit and receive data communications over the various data networks at varying rates of speed. To facilitate communications between computing devices (e.g., endpoint computing nodes), the data networks typically include one or more network computing nodes (e.g., compute servers, storage servers, etc.) to route communications (e.g., via network switches, network routers, etc.) that enter/exit a network (e.g., north-south network traffic) and between network computing nodes in the network (e.g., east-west network traffic).

Certain network infrastructures, such as data centers, may include tens of thousands or more of such network computing nodes and traffic forwarding devices. To handle such large network infrastructures, adaptive routing technologies have evolved using topology information of the network infrastructure. Traditional methods to determine the topology of the network infrastructure may include one or more of the computing nodes identifying neighboring computing nodes (e.g., those computing nodes that are one hop from the identifying computing node) using static topology information, which cannot typically be applied to the adaptive routing technologies.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
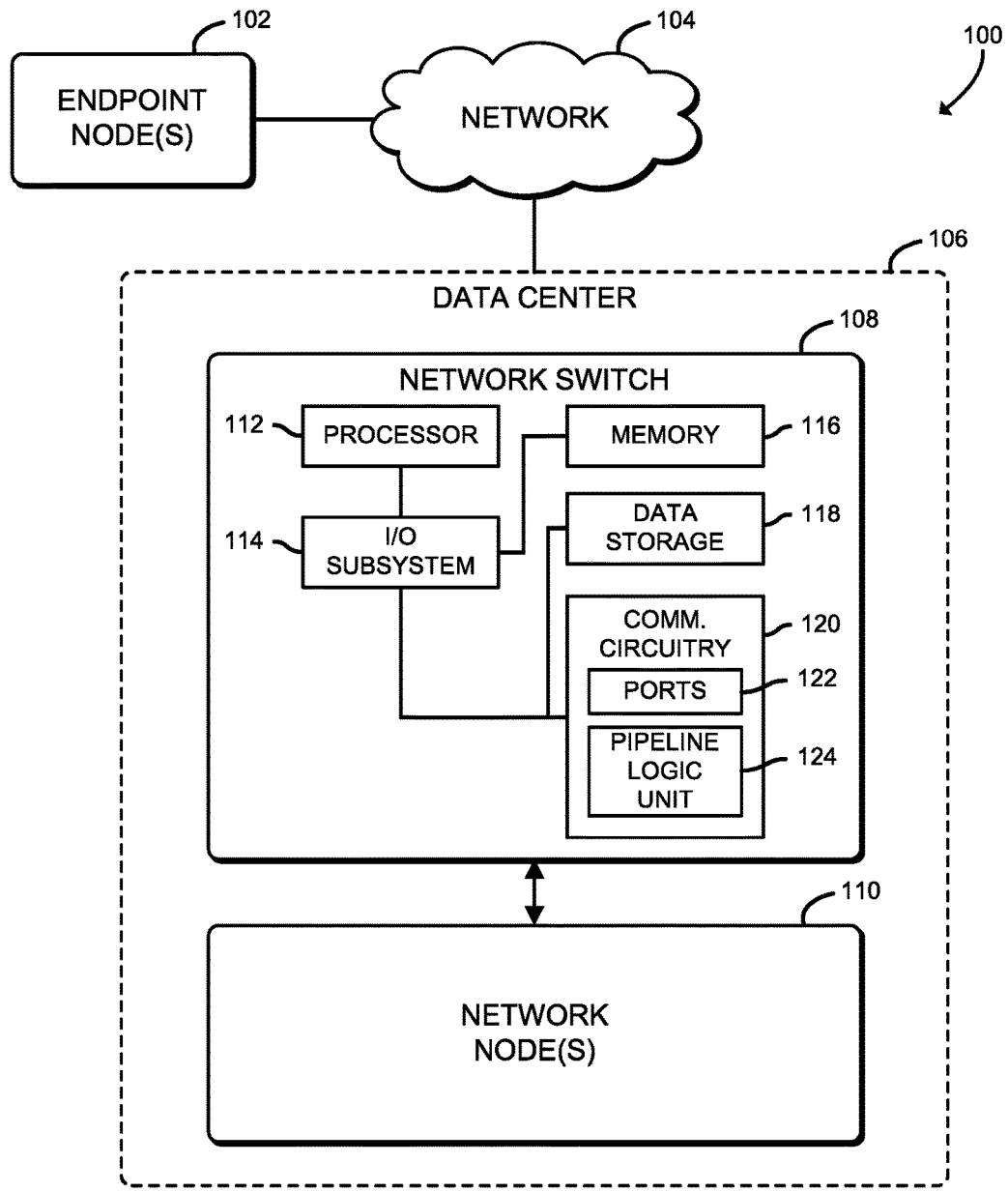
FIG. 1 is a simplified block diagram of at least one embodiment of a system for adaptive routing based on network traffic pattern characterization that includes a network switch.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for adaptive routing based on network traffic pattern characterization includes one or more endpoint nodes 102 communicatively coupled to an illustrative data center 106 via a network 104. The illustrative data center 106 includes a network switch 108 communicatively coupled to one or more network nodes 110 (e.g., one or more compute nodes, one or more storage nodes, a pool of compute/storage resources, etc.) in a switching fabric network topology. In use, the network switch 108 manages the ingress and egress of network traffic to and from the network nodes 110 to which the network switch 108 is connected. Generally, upon receiving a network packet at an input port of the network switch 108, the network switch 108 internally routes the received network packet to an output port of the network switch 108 based on which output port is in an applicable path (e.g., a minimal path or a non-minimal path) usable to transmit the network packet to a destination computing device. The applicable path may be determined based at least in part on information of the received network packet, such as a workload type, a destination address (e.g., an internet protocol (IP) address, a destination media access control (MAC) address, etc.), 5-tuple flow identification, etc. Further, in some embodiments, the network switch 108 is configured to determine present conditions of the data center 106 network and dynamically route (i.e., adaptively route) received network packets based on the present conditions, such as by using bias-based adaptive routing technologies.

Present bias-based adaptive routing technologies typically bias the routing decision towards a minimal path to reduce resource usage (e.g., resulting from processing/forwarding network traffic) based on a static, default minimal path bias. For example, in an illustrative embodiment in which the default minimal path bias is two to one (i.e., 2:1), the congestion rate on the minimal path is required to be more than two times greater than the congestion rate on the non-minimal path in order for the non-minimal path to be selected for forwarding a received network packet from the network switch 108.

However, under certain conditions, such as conditions in which a fabric network reaches saturation (e.g., network nodes 110 injecting more traffic than the fabric network can manage), perceived congestion may become skewed using present bias-based adaptive routing technologies, which can result in unfairness for some traffic patterns using the present bias-based adaptive routing technologies. Accordingly, unlike the present bias-based adaptive routing technologies, the network switch 108 as described herein is configured to identify and adjust a total congestion value (i.e., effectively removing the minimal path bias or restoring the default minimal path bias) based at least in part on a type of network traffic pattern associated with received network packets. To do so, as will be described in detail below, the network switch 108 characterizes traffic patterns of the network traffic received at the network switch 108 and adjusts the total congestion value based on the traffic pattern type associated with each received network packet to choose the appropriate output port from which to forward each received network packet.

The endpoint nodes 102 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, and/or a multiprocessor system.

The network 104 may be embodied as any type of wired and/or wireless communication network, including a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other network computing devices (e.g., virtual and/or physical routers, switches, network hubs, servers, storage devices, compute devices, etc.), as needed to facilitate communications between the endpoint nodes 102 and the data center 106, as well as networking devices between data centers 106, which are not shown to preserve clarity of the description.

Similarly, the data center 106 may include various network computing devices (e.g., virtual and/or physical routers, switches, network hubs, servers, storage devices, compute devices, etc.) as well as associated interconnects (e.g., interconnection switches, access switches, port extenders, etc.), switch management software, and/or data cables usable to provide a system of interconnects between the network computing devices (e.g., the network switch 108 and the network nodes 110), such as may be found in the data center 106 (e.g., in an HPC fabric), to provide low-latency and high-bandwidth communication between any two points in the data center 106.

The network switch 108 may be embodied as any type of switch, such as a disaggregated switch, a rack-mounted switch, a standalone switch, a fully managed switch, a partially managed switch, a full-duplex switch, and/or a half-duplex communication mode enabled switch. The network switch 108 may be positioned as a top-of-rack (ToR) switch, an end-or-rack (EoR) switch, a middle-of-rack (MoR) switch, or any position in which the network switch 108 may perform the functions described herein. For example, in some embodiments, the network switch 108 may be configured as a managed smart switch that includes a set of management features, such as may be required for the network switch 108 to perform the functions as described herein.

While the network switch 108 is illustratively embodied as a switch, in other embodiments the network switch may be embodied any type of network computing device (e.g., network traffic managing, processing, and/or forwarding device) capable of performing the functions described herein, such as, without limitation, a disaggregated router, a server (e.g., stand-alone, rack-mounted, blade, etc.), an enhanced network interface controller (NIC) (e.g., a host fabric interface (HFI)), a network appliance (e.g., physical or virtual), a web appliance, a distributed computing system, a processor-based system, and/or a multiprocessor system. It should be appreciated that while the illustrative system 100 includes only includes a single network switch 108, there may be any number of additional network switches 108, as well any number of additional network nodes 110, in other embodiments.

As shown in FIG. 1, the illustrative network switch 108 includes a processor 112, an input/output (I/O) subsystem 114, a memory 116, a data storage device 118, and communication circuitry 120. Of course, the network switch 108 may include fewer or other or additional components, such as those commonly found in a network computing device, in other embodiments. Additionally, in some embodiments, one or more of the illustrative components may be incorporated in, or otherwise form a portion of, another component. For example, the memory 116, or portions thereof, may be incorporated in the processor 112 in some embodiments.

Further, in some embodiments, one or more of the illustrative components may be omitted from the network switch 108.

The processor 112 may be embodied as any type of processor capable of performing the functions described herein. For example, the processor 112 may be embodied as one or more single core processors, on or more multi-core processors, a digital signal processor, a microcontroller, or other processor or processing/controlling circuit. Similarly, the memory 116 may be embodied as any type of volatile or non-volatile memory or data storage capable of performing the functions described herein. In operation, the memory 116 may store various data and software used during operation of the network switch 108, such as operating systems, applications, programs, libraries, and drivers.

The memory 116 is communicatively coupled to the processor 112 via the I/O subsystem 114, which may be embodied as circuitry and/or components to facilitate input/output operations with the processor 112, the memory 116, and other components of the network switch 108. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 112, the memory 116, and other components of the network switch 108, on a single integrated circuit chip.

The data storage device 118 may be embodied as any type of device or devices configured for short-term or long-term storage of data such as, for example, memory devices and circuits, memory cards, hard disk drives, solid-state drives, or other data storage devices. It should be appreciated that the data storage device 118 and/or the memory 116 (e.g., the computer-readable storage media) may store various data as described herein, including operating systems, applications, programs, libraries, drivers, instructions, etc., capable of being executed by a processor (e.g., the processor 112) of the network switch 108.

The communication circuitry 120 may be embodied as any communication circuit, device, or collection thereof, capable of enabling communications between the network switch 108 and other computing devices, such as the network nodes 110, as well as a remote network computing device (e.g., a network controller, a load balancing network switch/router, an aggregated network switch, another network switch 108, etc.) over a network (e.g., the network 104). The communication circuitry 120 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The illustrative communication circuitry 120 includes multiple switch ports 122 and a pipeline logic unit 124. The multiple switch ports 122 (i.e., input/output ports) may be embodied as any type of network port for transmitting and receiving data to/from the network switch 108. Accordingly, in some embodiments, the network switch 108 may be configured to create a separate collision domain for each of the switch ports 122. As such, depending on the network design of the network switch 108 and the operation mode (e.g., half-duplex, full-duplex, etc.), it should be appreciated that each of the network nodes 110 connected to one of the switch ports 122 of the network switch 108 may be configured to transfer data to any of the other network nodes 110 at any given time, and the transmissions should not interfere, or collide.

The pipeline logic unit 124 may be embodied as any specialized device, circuitry, hardware, or combination thereof to perform pipeline logic (e.g., hardware algorithms) for performing the functions described herein. In some embodiments, the pipeline logic unit 124 may be embodied as a system-on-a-chip (SoC) or otherwise form a portion of a SoC of the network switch 108 (e.g., incorporated, along with the processor 112, the memory 116, the communication circuitry 120, and/or other components of the network switch 108, on a single integrated circuit chip). Alternatively, in some embodiments, the pipeline logic unit 124 may be embodied as one or more discrete processing units of the network switch 108, each of which may be capable of performing one or more of the functions described herein. For example, the pipeline logic unit 124 may be configured to process network packets (e.g., parse received network packets, determine destination computing devices for each received network packets, forward the network packets to a particular buffer queue of a respective buffer of the network switch 108, etc.), perform computational functions, etc.

Each of the network nodes 110 may be embodied as any type of compute and/or storage device capable of performing the functions described herein. For example, each of the network nodes 110 may be embodied as, without limitation, one or more server computing devices, computer mainboards, daughtercards, expansion cards, system-on-a-chips, computer processors, consumer electronic devices, smart appliances, storage disks, and/or any other compute and/or storage device or collection of compute and/or storage devices capable of processing network communications. Accordingly, it should be appreciated that the various network nodes 110 may additionally include components similar to the illustrative network switch 108 as described above, such as, a processor, an I/O subsystem, memory, data storage, and/or communication circuitry. As such, to preserve clarity of the description, descriptions of such like and/or similar components are not described herein. Of course, it should be appreciated that one or more of the network nodes 110 may include additional and/or alternative components, such as those commonly found in a computing device (e.g., various input/output devices), in other embodiments. Additionally, in some embodiments, one or more of the illustrative components may be incorporated in, or otherwise from a portion of, another component.

Figure 2:
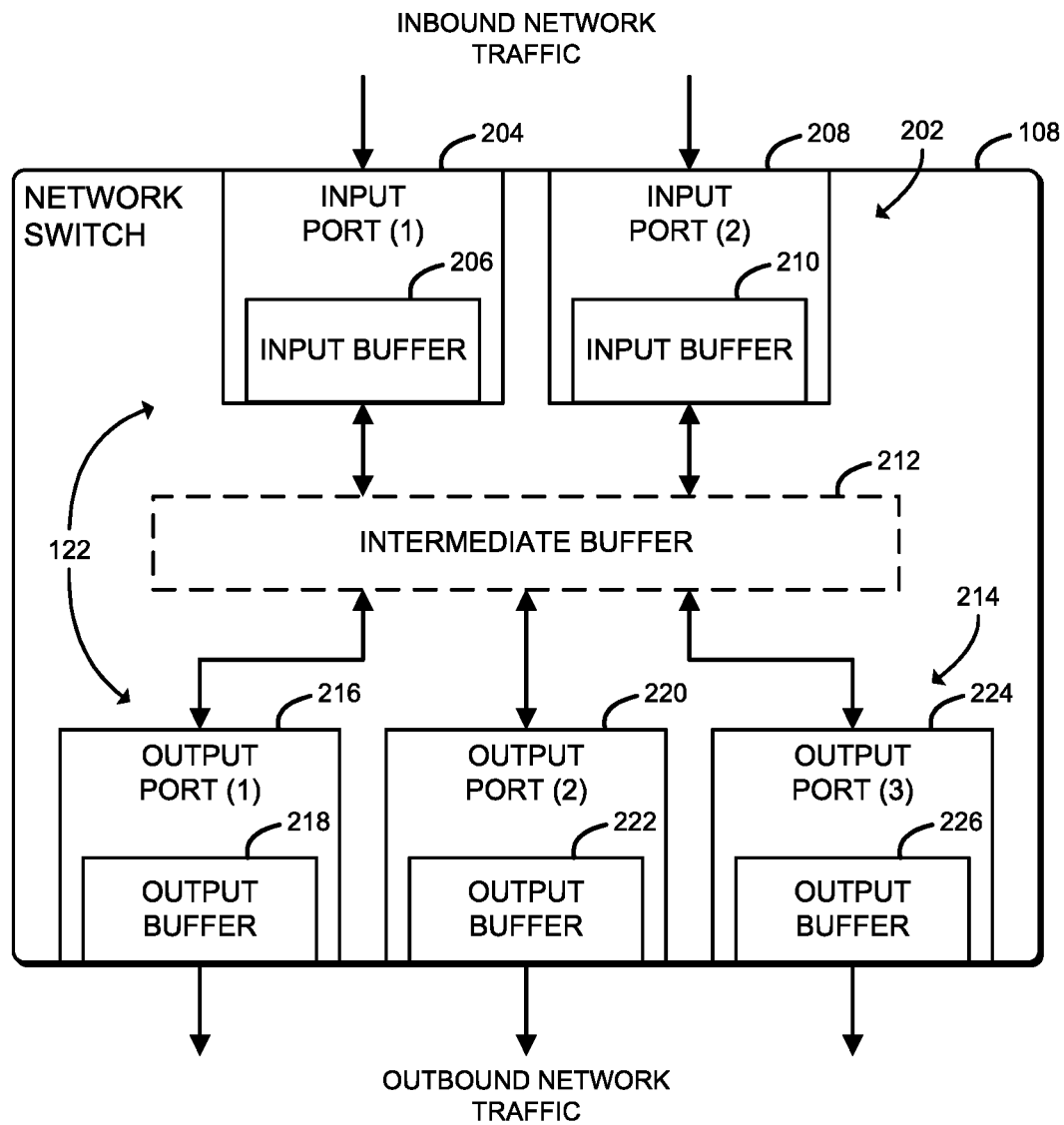
FIG. 2 is a simplified block diagram of at least one embodiment of network traffic flow through the network switch of the system of FIG. 1.

Referring now to FIG. 2, in an illustrative embodiment, the network switch 108 includes multiple input ports 202 communicatively coupled to multiple output ports 214 to facilitate the flow of network traffic through the network switch 108. Each of the input ports 202 is configured to receive inbound network traffic (e.g., network packets, messages, etc.) and transmit the received network traffic to a corresponding one of the output ports 214. The network traffic received by the input ports 202 is forwarded to the appropriate output ports 214 based on a routing decision (e.g., the adaptive routing technologies described herein), which may be made by a logical component (not shown) of the network switch 108, such as a network scheduler, or packet scheduler, and/or a queue manager. The illustrative input ports 202 (i.e., a first input port designated as input port (1) 204 and a second input port designated as input port (2) 208) each include an input buffer (i.e., input buffer 206 of input port (1) 204 and input buffer 210 of input port (2) 208) to store the received network packets (e.g., in input buffer queues of the input buffers 206, 210) before transmission to an appropriate one of the output ports 214.

In some embodiments, one or more intermediate buffers 212 (e.g., in intermediate buffer queues of the one or more intermediate buffers 212) may be used to buffer network traffic from the input ports 202 and utilize the adaptive routing technologies described herein to determine the appropriate one of the output ports 214 to transmit each received network packet. Each of the illustrative output ports 214 (i.e., a first output port designated as output port (1) 216, a second output port designated as output port (2) 220, and a third output port designated as output port (3) 224) similarly include an output buffer (i.e., output buffer 218 of output port (1) 204, output buffer 222 of output port (2) 220, and output buffer 226 of output port (3) 224) for queueing received network packets from the input ports 202 or the intermediate buffer 212, depending on the embodiment.

The output ports 214 are configured to forward outbound network traffic (i.e., from output buffer queues of the output buffers) to a target computing device (e.g., a corresponding one of the network nodes 110, another network switch 108, etc.) to which the network packet is to be forwarded. It should be appreciated that each output buffer of the output ports 214 can include more than one output buffer queue and each of the output buffer queues can be assigned to a different input row (e.g., in a tile-based architecture) or to one or more virtual channels, depending on the embodiment. It should be appreciated that each of the output buffer queues logically belongs to a respective one of the output ports 214, but may physically be present in another location (e.g., another component) within the switch 108. For example, in some embodiments, there may be a per-output-port queue in the intermediate buffer 212 or one of the input buffers 206 that is logically mapped to a respective one of the output ports 214.

Figure 3:
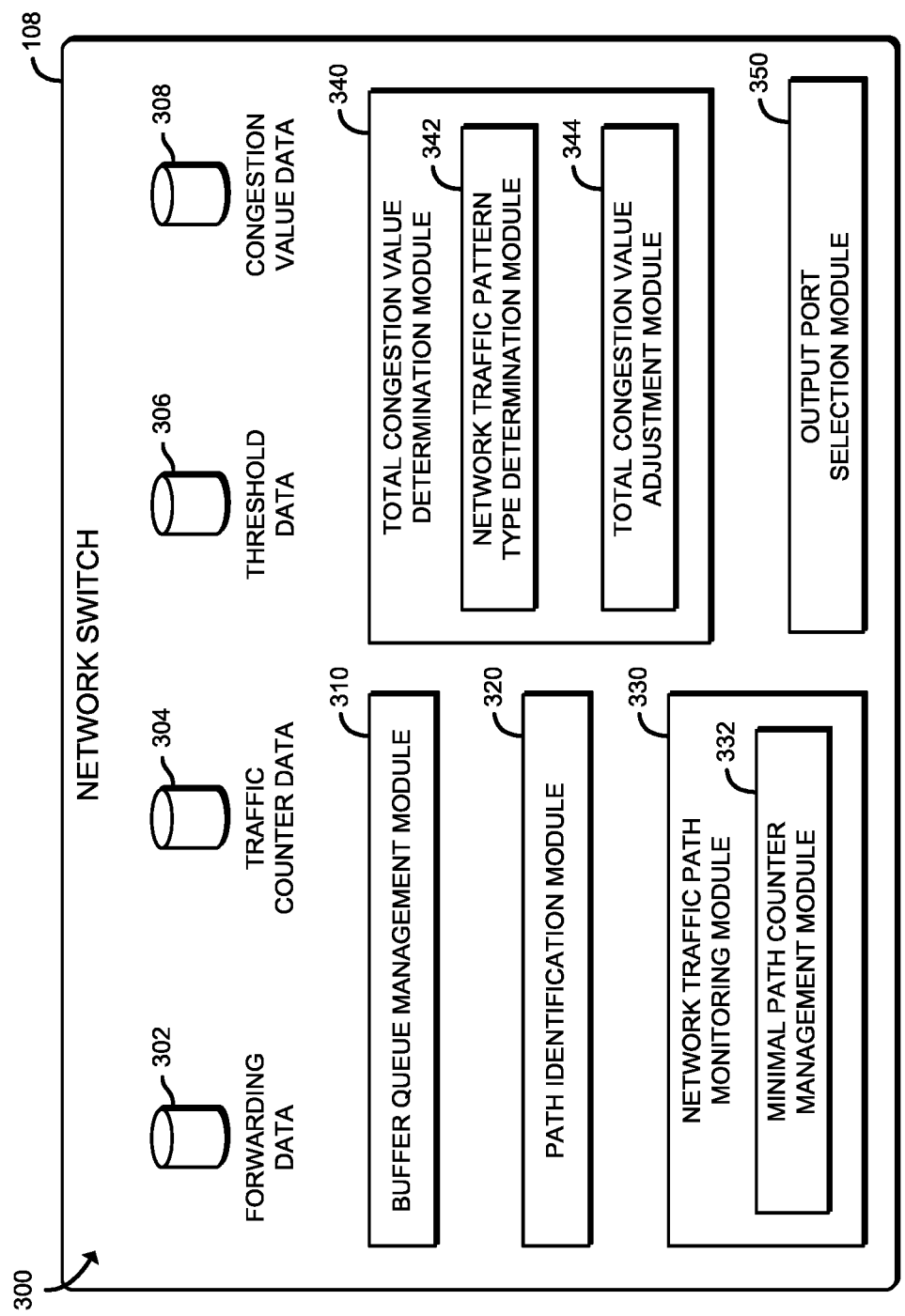
FIG. 3 is a simplified block diagram of at least one embodiment of an environment that may be established by the network switch of the system of FIG. 1.

Referring now to FIG. 3, in an illustrative embodiment, the network switch 108 establishes an environment 300 during operation. The illustrative environment 300 includes a buffer queue management module 310, a path identification module 320, a network traffic path monitoring module 330, a total congestion value determination module 340, and an output port selection module 350. The various modules of the environment 300 may be embodied as hardware, firmware, software, or a combination thereof. As such, in some embodiments, one or more of the modules of the environment 300 may be embodied as circuitry or collection of electrical devices (e.g., a buffer queue management circuit 310, a path identification circuit 320, a network traffic path monitoring circuit 330, a total congestion value determination circuit 340, an output port selection circuit 350, etc.).

It should be appreciated that, in such embodiments, one or more of the buffer queue management circuit 310, the path identification circuit 320, the network traffic path monitoring circuit 330, the total congestion value determination circuit 340, and the output port selection circuit 350 may form a portion of the one or more of the processor(s) 112, the I/O subsystem 114, the communication circuitry 120, the pipeline logic unit 124, and/or other components of the network switch 108. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the one or more processors and/or other components of the network switch 108. It should be further appreciated that, in some embodiments, one or more of the buffer queue management circuit 310, the path identification circuit 320, the network traffic path monitoring circuit 330, the total congestion value determination circuit 340, and the output port selection circuit 350 may be implemented as special purpose hardware components, such as those circuits that may be on a critical path.

In the illustrative environment 300, the network switch 108 further includes forwarding data 302, traffic counter data 304, threshold data 306, and congestion value data 308, each of which may be stored in a memory and/or data storage device of the network switch 108. Further, each of the forwarding data 302, the traffic counter data 304, and the threshold data 306 may be accessed by the various modules and/or sub-modules of the network switch 108. Additionally, it should be appreciated that in some embodiments the data stored in, or otherwise represented by, each of the forwarding data 302, the traffic counter data 304, the threshold data 306, and the congestion value data 308 may not be mutually exclusive relative to each other.

For example, in some implementations, data stored in the forwarding data 302 may also be stored as a portion of one or more of the traffic counter data 304, the threshold data 306, and/or the congestion value data 308, or vice versa. As such, although the various data utilized by the network switch 108 is described herein as particular discrete data, such data may be combined, aggregated, and/or otherwise form portions of a single or multiple data sets, including duplicative copies, in other embodiments. It should be further appreciated that the network switch 108 may include additional and/or alternative components, sub-components, modules, sub-modules, and/or devices commonly found in a network computing device, which are not illustrated in FIG. 3 for clarity of the description.

The buffer queue management module 310, which may be embodied as hardware, firmware, software, virtualized hardware, emulated architecture, and/or a combination thereof as discussed above, is configured to manage the buffers (e.g., each buffer including a number of buffer queues) of the network switch 108. For example, the buffer queue management module 310 may be configured to manage the input buffer (e.g., of the input ports 202), the intermediate buffers (e.g., the intermediate buffers 212 of FIG. 2), and output buffer (e.g., of the output ports 214) of the network switch 108. To do so, the buffer queue management module 310 is configured to receive the network traffic, enqueue and dequeue network traffic received by the network switch 108 into and out of the respective buffers (i.e., the respective buffer queues), and transmit the processed network traffic.

The path identification module 320, which may be embodied as hardware, firmware, software, virtualized hardware, emulated architecture, and/or a combination thereof as discussed above, is configured to identify applicable paths (e.g., minimal paths and non-minimal paths) for each received network packet. To do so, the path identification module 320 may identify a characteristic of the network packet to determine a destination computing device. The characteristic may include any data usable to identify the corresponding destination computing device, such as a workload type, a destination address (e.g., an internet protocol (IP) address, a destination media access control (MAC) address, etc.), 5-tuple flow identification, etc. Accordingly, in some embodiments, the characteristic may be used to perform a lookup (e.g., in a flow lookup table, a routing table, etc.) to determine the destination computing device. In some embodiments, the lookup data may be stored in the forwarding data 302.

Additionally, the path identification module 320 is configured to identify a set of output ports associated with the identified applicable paths to the destination computing device. It should be appreciated that, in adaptive routing, the network switch 108 can route a network packet either through a minimal path or a non-minimal path. Accordingly, the path identification module 320 is configured to identify one or more minimal paths and one or more non-minimal paths based on the determined destination computing device. It should be further appreciated that a minimal path is a path to the determined destination computing device that takes the least amount of hops, while a non-minimal path is any path to the determined destination computing device that takes more hops (e.g., twice as many hops) as the minimal path(s). Accordingly, it should be appreciated that the computing device to which the network packet is forwarded from the network switch 108 may not be to the determined destination computing device, but rather a target computing device in the path between the network switch 108 and the determined destination computing device. In some embodiments, path data (e.g., hop data, in-path computing device information, etc.) may be stored in the forwarding data 302.

The network traffic path monitoring module 330, which may be embodied as hardware, firmware, software, virtualized hardware, emulated architecture, and/or a combination thereof as discussed above, is configured to monitor network traffic pattern levels based on a number of times that each output port appears as a minimal path option for a received network packet. To do so, the illustrative network traffic path monitoring module 330 includes a minimal path counter management module 332. It should be appreciated that the minimal path counter management module 332 may be separately embodied as hardware, firmware, software, virtualized hardware, emulated architecture, and/or a combination thereof. For example, the minimal path counter management module 332 may be embodied as a hardware component in some embodiments, and embodied as a virtualized hardware component or as some other combination of hardware, firmware, software, virtualized hardware, emulated architecture, and/or a combination thereof, in other embodiments.

The minimal path counter management module 332 is configured to manage minimal path counters for each of the output ports. To do so, the minimal path counter management module 332 is configured to increment a minimal path counter corresponding to the respective output port upon a determination (e.g., by the path identification module 320) that the output port corresponds to a minimal output path of a received network packet. Additionally, the minimal path counter management module 332 is configured to capture a value of each of the minimal path counters upon a determination that the end of a network traffic path monitoring window has been reached. The monitoring window may be embodied as any type of threshold usable to trigger the minimal path counter capture, such as a duration of time, a maximum number of cycles, a maximum number of network packets dequeued from the input buffer queues (e.g., of the input buffers 206, 210), a maximum number of network packets dequeued from the intermediate buffer 212, etc. In some embodiments, values of the minimal path counters may be stored in the traffic counter data 304. Additionally or alternatively, data related to the monitoring window may be stored in the threshold data 306. It should be appreciated that the minimal path counter management 332 is further configured to reset the minimal path counters to zero subsequent to capturing each of their respective values.

The total congestion value determination module 340, which may be embodied as hardware, firmware, software, virtualized hardware, emulated architecture, and/or a combination thereof as discussed above, is configured to determine a total congestion value for each output port. To do so, the illustrative total congestion value determination module 340 includes a network traffic pattern type determination module 342 and a total congestion value determination module 344. It should be appreciated that the network traffic pattern type determination module 342 and the total congestion value determination module 344 may be separately embodied as hardware, firmware, software, virtualized hardware, emulated architecture, and/or a combination thereof. For example, the network traffic pattern type determination module 342 may be embodied as a hardware component in some embodiments, while the total congestion value determination module 344 may be embodied as a virtualized hardware component or as some other combination of hardware, firmware, software, virtualized hardware, emulated architecture, and/or a combination thereof.

The network traffic pattern type determination module 342 is configured to determine a network traffic pattern type for each received network packet. For example, the network traffic pattern type determination module 342 may be configured to determine whether the network traffic pattern type corresponds to uniform random network traffic (e.g., in which a particular one of the network nodes 110 sends each packet to some other random network node 110) or static permutation network traffic (e.g., in which a particular network nodes 110 sends all of its packet to another network node 110 each time). The network traffic pattern type determination module 342 is configured to determine the network traffic pattern type based on a most recently captured minimal path counter for each minimal path output port (e.g., such as may be captured by the minimal path counter management module 332), a predetermined counter threshold, a present congestion value, and a maximum congestion threshold.

To determine whether the network traffic pattern type corresponds to a static permutation network traffic pattern type for a particular minimal path output port, the network traffic pattern type determination module 342 is configured to determine whether the minimal path counter for that particular minimal path output port is greater than the predetermined threshold and whether the present congestion value for that particular minimal path output port is equal to the maximum congestion threshold. To determine whether the network traffic pattern type corresponds to a uniform random network traffic pattern type for a particular non-minimal path output port, the network traffic pattern type determination module 342 is configured to determine whether the minimal path counter for that particular non-minimal output port is greater than the predetermined threshold and whether the present congestion value for that particular non-minimal output port is greater than or equal to half of the maximum congestion threshold. It should be appreciated that the present congestion value may be determined using any present congestion-based adaptive routing based technologies.

It should also be appreciated that actual uniform random network traffic may appears as a static permutation traffic network traffic pattern type on a minimal path and a uniform random network traffic pattern type on a non-minimal path, or neither network traffic pattern type on minimal or non-minimal paths. Similarly, it should also be appreciated that actual static permutation traffic may appear as a static network traffic pattern type on the minimal path and neither network traffic pattern type on a non-minimal path. It should be further appreciated that other patterns may be viewed as a combination of uniform random and static permutation network traffic. In some embodiments, threshold values (e.g., the maximum congestion threshold) may be stored in the threshold data 306.

As described previously, the network traffic pattern type may be characterized as a uniform random network traffic pattern type or a static permutation network traffic pattern type. Accordingly, it should be appreciated that the uniform random network traffic pattern type is already random, resulting in the minimal path being different; whereas the static permutation network traffic pattern type results in the same minimal path being selected each time. As such, when the minimal path is saturated (i.e., full or otherwise exceeding a saturation threshold), maintaining the minimal path bias at the default value can result in fairness issues being introduced for those network nodes 110 with the most congested minimal path.

Accordingly, the total congestion value adjustment module 344 is configured to determine a congestion level for each output port based on the network traffic pattern type, such as may be determined by the path congestion determination module 342. As described previously, the minimal path bias is usable to determine which output port of the network switch 108 from which to forward a received network packet from the network switch 108. As such, the total congestion value adjustment module 344 is configured to adjust a total congestion value to effectively remove the minimal path bias (e.g., upon determining the network traffic pattern type corresponds to a static permutation network traffic pattern type) or set the total congestion value to effectively restore the default minimal path bias (e.g., upon determining the network traffic pattern type corresponds to a uniform random network traffic pattern type).

To effectively remove the minimal path bias in minimal path output ports, in some embodiments, the total congestion value adjustment module 344 may be configured to set the total congestion value to a value based on a result of multiplying the maximum congestion threshold (i.e., equal to the present congestion value) of the output port by an amount equal to the default minimal path bias (e.g., multiply by two for such embodiments in which the minimal bias is two to one). It should be appreciated that, in some embodiments, such as those embodiments in which effectively removing the minimal path bias results in a minimal path being chosen (e.g., by default all total congestion values result in a tie leading towards a minimal path being chosen), the total congestion value may be incremented (e.g., by a value of one) to break all ties in favor of non-minimal paths. To effectively restore the default minimal path bias in non-minimal path output ports, in some embodiments, the total congestion value adjustment module 344 may be configured to set the total congestion value to a value based on a result of multiplying the present congestion value of the output port by an amount equal to the default minimal path bias (e.g., multiply by two for such embodiments in which the minimal bias is two to one).

The output port selection module 350, which may be embodied as hardware, firmware, software, virtualized hardware, emulated architecture, and/or a combination thereof as discussed above, is configured to select which output port to transfer the network packet to. The output port selection module 350 is configured to select the output port based on the lowest total congestion value across the output ports identified in the forwarding path (e.g., minimal paths and non-minimal paths) of a received network packet, such as may be determined by the total congestion value determination module 340. In other words, the output port selection module 350 is configured to determine which output port to queue the network packet in (i.e., to be forwarded to a target computing device) based on which output buffer queue has the lowest total congestion value, thereby promoting fairness in selection across the output ports (e.g., the output ports 214 of FIG. 2). In some embodiments, the total congestion value may be stored in the congestion value data 308.

Figure 4:
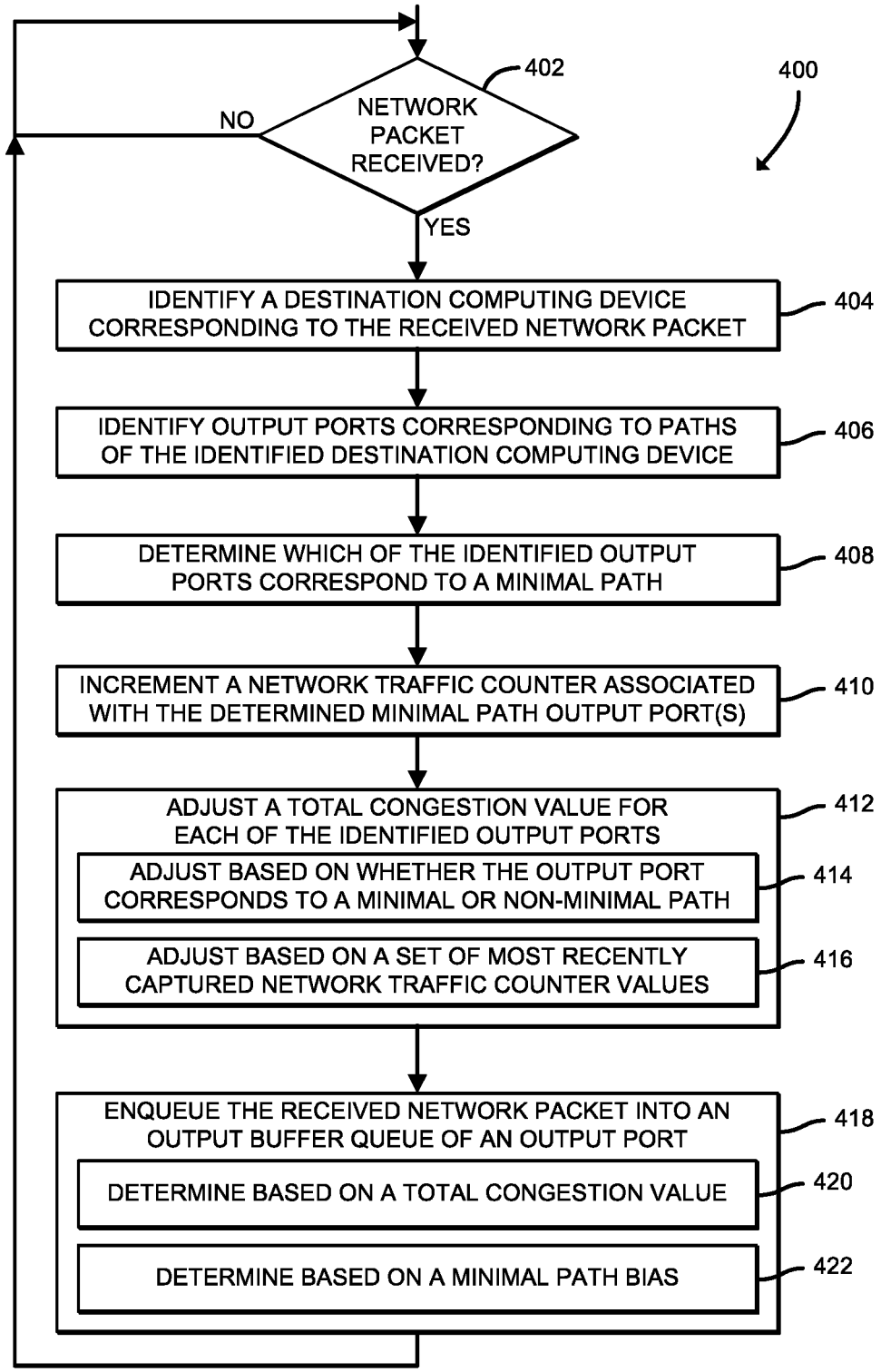
FIG. 4 is a simplified flow diagram of at least one embodiment of a method for adaptive routing based on network traffic pattern characterization that may be executed by the network switch of FIG. 3.

Referring now to FIG. 4, in use, the network switch 108 (e.g., the pipeline logic unit 124) may execute a method 400 for adaptive routing based on network traffic pattern characterization. The method 400 begins in block 402, in which the network switch 108 determines whether a network packet has been received. If so, the method 400 advances to block 404, in which the network switch 108 identifies a destination computing device (e.g., a network node local to or remote of the network switch 108) corresponding to the received network packet. In block 406, the network switch 108 identifies multiple output ports to forward the received network packet to, each of which are identified based on which of the output ports correspond to paths (e.g., minimal and/or non-minimal paths) to the destination computing device. As described previously, it should be appreciated that the identified output ports may output the network packet to a target computing device (e.g., another network switch 108, a network node local to or remote of the network switch 108, etc.) different from the destination computing device that is in an identified path to the destination computing device.

In block 408, the network switch 108 determines which of the output ports identified in block 406 corresponds to a minimal path. In block 410, the network switch 108 increments a minimal path counter corresponding to each of the minimal path output ports determined in block 408. In block 412, the network switch 108 adjusts a total congestion value for each of the identified output ports of the network switch 108 (see, e.g., the method 600 of FIG. 6) based on the network traffic pattern type. As described previously, the network traffic pattern type may include a uniform random network traffic pattern type, a static permutation network traffic pattern type, or any network traffic pattern type combination thereof. In block 414, the network switch 108 adjusts the total congestion value for each of the identified output ports based on whether the output port corresponds to a minimal or non-minimal path. Additionally, in block 416, the network switch 108 adjusts the total congestion value for each of the identified output ports based on a set of the most recently captured minimal path counter values.

In block 418, the network switch 108 enqueues the network packet received in block 502 into an output buffer queue of an output port. In block 420, the network switch 108 determines which output port in which to enqueue the network packet based on a total congestion value, such as may be adjusted via the method 600 of FIG. 6. Additionally, in block 422, the network switch 108 determines which output port in which to enqueue the network packet based on a minimal path bias. For example, the network switch 108 may determine whether to use a minimal path output port or a non-minimal path output port, and then determine which output port in the chosen path type corresponds to the lowest total congestion value.

Figure 5:
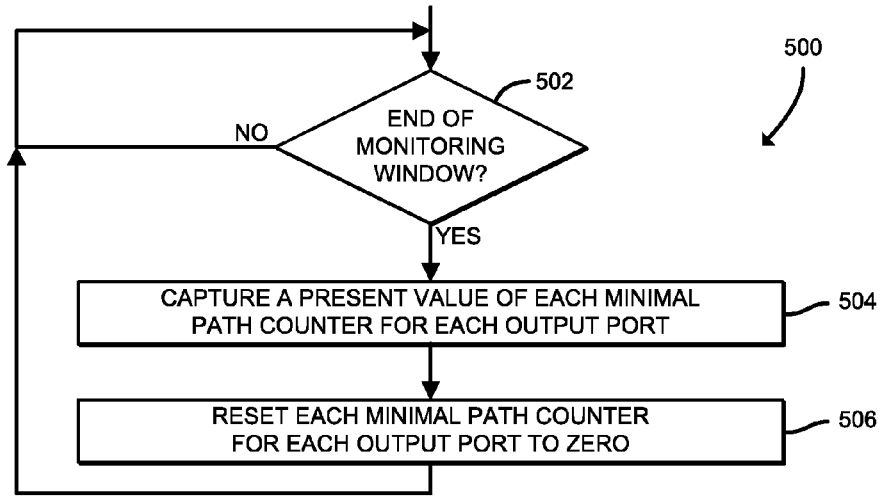
FIG. 5 is a simplified flow diagram of at least one embodiment of a method for monitoring network traffic usable to characterize network traffic patterns that may be executed by the network switch of FIG. 3.

Referring now to FIG. 5, in use, the network switch 108 (e.g., the pipeline logic unit 124) may execute a method 500 for monitoring network traffic usable to characterize network traffic patterns. The method 500 begins in block 502, in which the network switch 108 determines whether the end of a network traffic path monitoring window has been reached. As described previously, the monitoring window may be embodied as any type of threshold usable to indicate the minimal path counters are to be captured, such as a duration of time, a maximum number of cycles, a maximum number of network packets dequeued from the input buffer queues (e.g., of the input buffers 206, 210), a maximum number of network packets dequeued from the intermediate buffer 212, etc.

It should be appreciated that method 500 may be performed in parallel with the method 400. In other words, the end of monitoring window check performed in block 502 may be triggered by an event triggered by the method 400, an event triggered outside of the method 400, or by some other polling method external to the method 400. If the end of the monitoring window has been reached, the method 500 advances to block 504, in which the network switch 108 captures a present value of all the minimal path counters which have been incremented with each instance that a corresponding output port has been identified as a minimal path for a received network packet (see, e.g., the method 400 of FIG. 4). In block 506, the network switch 108 resets each of the minimal path counters to zero.

Figure 6:
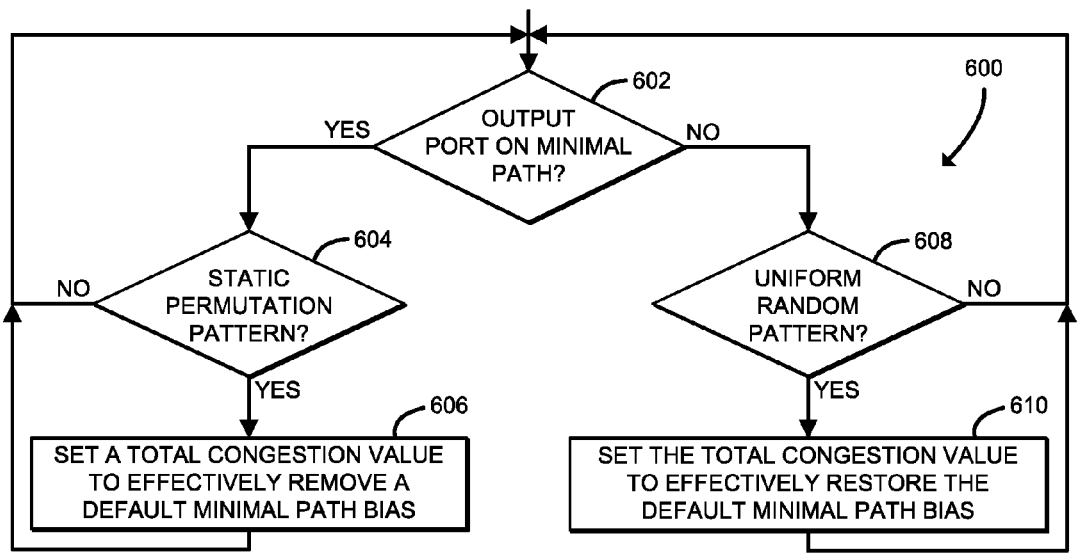
FIG. 6 is a simplified flow diagram of at least one embodiment of a method for characterizing network traffic patterns that may be executed by the network switch of FIG. 3.

Referring now to FIG. 6, in use, the network switch 108 (e.g., the pipeline logic unit 124) may execute a method 600 for characterizing network traffic patterns at each output port of the network switch 108, such as may be performed upon receiving a network packet (see, e.g., the method 400 of FIG. 4). The method 600 begins in block 602, in which the network switch 108 determines whether the output port corresponds to a minimal path (i.e., as opposed to a non-minimal path). If so, the method 600 advances to block 604 in which the network switch 108 determines whether the traffic pattern type corresponds to a static permutation network traffic pattern type. As described previously, to determine whether the network traffic pattern type corresponds to a static permutation network traffic pattern type for a particular minimal path output port, the network switch 108 is configured to determine whether the minimal path counter for that particular minimal path output port is greater than the predetermined threshold and whether the present congestion value for that particular minimal path output port is equal to the maximum congestion threshold.

If the network switch 108 determines the traffic pattern type corresponds to a static permutation network traffic pattern type, the method 600 advances to block 606, in which the network switch 108 sets a total congestion value to effectively remove a default minimal path bias; otherwise, the method 600 returns to block 602 to determine whether an output port to be analyzed for a received network packet resides on a minimal path. To effectively remove the minimal path bias in minimal path output ports, in some embodiments, the network switch 108 may be configured to set the total congestion value to a value based on a result of multiplying the maximum congestion threshold (i.e., equal to the present congestion value) of the output port by an amount equal to the default minimal path bias (e.g., multiply by two for such embodiments in which the minimal bias is two to one). It should be appreciated that, in some embodiments, such as those embodiments in which effectively removing the minimal path bias results in a minimal path being chosen (e.g., by default all total congestion values result in a tie leading towards a minimal path being chosen), the total congestion value may be incremented (e.g., by a value of one) to break all ties in favor of non-minimal paths.

Referring back to block 602, if the network switch 108 determines the output port corresponds to a non-minimal path (i.e., does not correspond to a minimal path), the method 600 advances to block 608, in which the network switch 108 determines whether the traffic pattern type corresponds to a uniform random network traffic pattern type. As also described previously, to determine whether the network traffic pattern type corresponds to a uniform random network traffic pattern type for a particular non-minimal path output port, the network switch 108 is configured to determine whether the minimal path counter for that particular non-minimal output port is greater than the predetermined threshold and whether the present congestion value for that particular non-minimal output port is greater than or equal to half of the maximum congestion threshold. It should be appreciated that the present congestion value may be determined using any present congestion-based adaptive routing based technologies.

If the network switch 108 determines the traffic pattern type corresponds to a uniform random network traffic pattern type, the method 600 advances to block 610, in which the network switch 108 sets the total congestion value to effectively restore the default minimal path bias; otherwise, the method 600 returns to block 602 to determine whether an output port to be analyzed for a received network packet resides on a minimal path. To effectively restore the default minimal path bias in non-minimal path output ports, in some embodiments, the network switch 108 may be configured to set the total congestion value to a value based on a result of multiplying the present congestion value of the output port by an amount equal to the default minimal path bias (e.g., multiply by two for such embodiments in which the minimal bias is two to one).

It should be appreciated that, in some embodiments, the methods 400, 500, and 600 may be embodied as various instructions stored on a computer-readable media, which may be executed by a processor (e.g., the processor 112), the communication circuitry 120, and/or other components of the network switch 108 to cause the network switch 108 to perform at least a portion of the methods 400, 500, and 600. The computer-readable media may be embodied as any type of media capable of being read by the network switch 108 including, but not limited to, the memory 116, the data storage device 118, other memory or data storage devices of the network switch 108, portable media readable by a peripheral device of the network switch 108, and/or other media. Additionally or alternatively, in some embodiments, the pipeline logic unit 124 may be configured to perform at least a portion of the methods 400, 500, and/or 600 or otherwise cause the network switch 108 to perform at least a portion of the methods 400, 500, and/or 600.

EXAMPLES

Illustrative examples of the technologies disclosed herein are provided below. An embodiment of the technologies may include any one or more, and any combination of, the examples described below.

Example 1 includes a network switch for adaptive routing based on network traffic pattern characterization, the network switch comprising a plurality of input ports communicatively coupled to a plurality of output ports; and a pipeline logic unit to receive a network packet via one of the plurality of input ports of the network switch; identify a set of the plurality of output ports, wherein each of the set of output ports correspond to a path usable to forward the received network packet to a destination computing device; adjust a total congestion value for each of the set of output ports based on a type of the path to which each of the set of output ports corresponds and a value of a minimal path counter to which each of the set of output ports corresponds, wherein the type of the path comprises one of a minimal path or a non-minimal path; and enqueue the received network packet into an output buffer queue of one of the set of output ports based on the total congestion value.

Example 2 includes the subject matter of Example 1, and wherein the pipeline logic unit is further to identify a subset of the set of output ports, wherein each of the subset of output ports corresponds to a minimal path; and increment the minimal path counter associated with each of the subset of output port.

Example 3 includes the subject matter of any of Examples 1 and 2, and wherein the pipeline logic unit is further to determine whether an end of a network traffic path monitoring window has been reached; capture, upon a determination that the end of the network traffic path monitoring window has been reached, a present value of the minimal path counter associated with each output port; and reset each minimal path counter to zero.

Example 4 includes the subject matter of any of Examples 1-3, and wherein to adjust the total congestion value for each of the set of output ports comprises to adjust the total congestion value as a function of the captured present value of the minimal path counter corresponding to each of the set of output ports.

Example 5 includes the subject matter of any of Examples 1-4, and wherein to determine whether the end of the network traffic path monitoring window has been reached comprises to determine one of a duration of time has elapsed, a maximum number of cycles of one of the one or more processors has been reached, or a maximum number of network packets have been dequeued from one of the plurality of input ports.

Example 6 includes the subject matter of any of Examples 1-5, and wherein to adjust the total congestion value for each of the set of output ports comprises to (i) determine a network traffic pattern for each of the set of output ports, (ii) characterize each network traffic pattern as a uniform random network traffic pattern type or a static permutation network traffic pattern type, and (ii) adjust the total congestion value for each of the set of output ports based on the type of network traffic pattern.

Example 7 includes the subject matter of any of Examples 1-6, and wherein the network traffic pattern comprises the uniform random network traffic pattern type for a non-minimal path output port or the static permutation network traffic pattern type for a minimal path output port.

Example 8 includes the subject matter of any of Examples 1-7, and wherein to determine whether the network traffic pattern is characterized as the uniform random network traffic pattern type for one of the set of output ports comprises to (i) determine whether the minimal path counter corresponding to the one of the set of output ports is greater than a predetermined threshold and (ii) determine whether a present congestion value corresponding to the one of the set of output ports is greater than or equal to half of a maximum congestion threshold.

Example 9 includes the subject matter of any of Examples 1-8, and wherein to determine whether the network traffic pattern is characterized as the static permutation network traffic pattern type for one of the set of output ports comprises to (i) determine whether the minimal path counter corresponding to the one of the set of output ports is greater than a predetermined threshold and (ii) determine whether a present congestion value corresponding to the one of the set of output ports is equal to a maximum congestion threshold.

Example 10 includes the subject matter of any of Examples 1-9, and wherein to adjust the total congestion value for one of the set of output ports based on the type of network traffic pattern comprises to set the total congestion value for the one of the set of output ports to a value sufficient to exceed a default minimum path bias upon a determination that the output port corresponds to a minimal path and the network traffic pattern is characterized as the static permutation network traffic pattern type.

Example 11 includes the subject matter of any of Examples 1-10, and wherein to adjust the total congestion value for one of the set of output ports based on the type of network traffic pattern comprises to set the total congestion value for the one of the set of output ports to a value equal to a default minimum path bias upon a determination that the output port corresponds to a non-minimal path and the network traffic pattern is characterized as the uniform random network traffic pattern type.

Example 12 includes a network switch for adaptive routing based on network traffic pattern characterization, the network switch comprising one or more processors; a plurality of input ports communicatively coupled to a plurality of output ports; a buffer queue management circuit to receive a network packet via one of the plurality of input ports of the network switch; a path identification circuit to identify a set of the plurality of output ports, wherein each of the set of output ports correspond to a path usable to forward the received network packet to a destination computing device; and a total congestion value determination circuit to adjust a total congestion value for each of the set of output ports based on a type of the path to which each of the set of output ports corresponds and a value of a minimal path counter to which each of the set of output ports corresponds, wherein the type of the path comprises one of a minimal path or a non-minimal path, wherein the buffer queue management circuit is further to enqueue the received network packet into an output buffer queue of one of the set of output ports based on the total congestion value.

Example 13 includes the subject matter of Example 12, and wherein the path identification circuit is further to identify a subset of the set of output ports, wherein each of the subset of output ports corresponds to a minimal path; and increment the minimal path counter associated with each of the subset of output port.

Example 14 includes the subject matter of any of Examples 12 and 13, and further including a network traffic path monitoring window to determine whether an end of a network traffic path monitoring window has been reached; capture, upon a determination that the end of the network traffic path monitoring window has been reached, a present value of the minimal path counter associated with each output port; and reset each minimal path counter to zero.

Example 15 includes the subject matter of any of Examples 12-14, and wherein to adjust the total congestion value for each of the set of output ports comprises to adjust the total congestion value as a function of the captured present value of the minimal path counter corresponding to each of the set of output ports.

Example 16 includes the subject matter of any of Examples 12-15, and wherein to determine whether the end of the network traffic path monitoring window has been reached comprises to determine one of a duration of time has elapsed, a maximum number of cycles of one of the one or more processors has been reached, or a maximum number of network packets have been dequeued from one of the plurality of input ports.

Example 17 includes the subject matter of any of Examples 12-16, and wherein to adjust the total congestion value for each of the set of output ports comprises to (i) determine a network traffic pattern for each of the set of output ports, (ii) characterize each network traffic pattern as a uniform random network traffic pattern type or a static permutation network traffic pattern type, and (ii) adjust the total congestion value for each of the set of output ports based on the type of network traffic pattern.

Example 18 includes the subject matter of any of Examples 12-17, and wherein the network traffic pattern comprises the uniform random network traffic pattern type for a non-minimal path output port or the static permutation network traffic pattern type for a minimal path output port.

Example 19 includes the subject matter of any of Examples 12-18, and wherein to determine whether the network traffic pattern is characterized as the uniform random network traffic pattern type for one of the set of output ports comprises to (i) determine whether the minimal path counter corresponding to the one of the set of output ports is greater than a predetermined threshold and (ii) determine whether a present congestion value corresponding to the one of the set of output ports is greater than or equal to half of a maximum congestion threshold.

Example 20 includes the subject matter of any of Examples 12-19, and wherein to determine whether the network traffic pattern is characterized as the static permutation network traffic pattern type for one of the set of output ports comprises to (i) determine whether the minimal path counter corresponding to the one of the set of output ports is greater than a predetermined threshold and (ii) determine whether a present congestion value corresponding to the one of the set of output ports is equal to a maximum congestion threshold.

Example 21 includes the subject matter of any of Examples 12-20, and wherein to adjust the total congestion value for one of the set of output ports based on the type of network traffic pattern comprises to set the total congestion value for the one of the set of output ports to a value sufficient to exceed a default minimum path bias upon a determination that the output port corresponds to a minimal path and the network traffic pattern is characterized as the static permutation network traffic pattern type.

Example 22 includes the subject matter of any of Examples 12-21, and wherein to adjust the total congestion value for one of the set of output ports based on the type of network traffic pattern comprises to set the total congestion value for the one of the set of output ports to a value equal to a default minimum path bias upon a determination that the output port corresponds to a non-minimal path and the network traffic pattern is characterized as the uniform random network traffic pattern type.

Example 23 includes a method for adaptive routing based on network traffic pattern characterization, the method comprising receiving, by a network switch, a network packet via one of a plurality of input ports of the network switch; identifying, by the network switch, a set of a plurality of output ports, wherein each of the set of output ports correspond to a path usable to forward the received network packet to a destination computing device; adjusting, by the network switch, a total congestion value for each of the set of output ports based on a type of the path to which each of the set of output ports corresponds and a value of a minimal path counter to which each of the set of output ports corresponds, wherein the type of the path comprises one of a minimal path or a non-minimal path; and enqueuing, by the network switch, the received network packet into an output buffer queue of one of the set of output ports based on the total congestion value.

Example 24 includes the subject matter of Example 23, and further including identifying, by the network switch, a subset of the set of output ports, wherein each of the subset of output ports corresponds to a minimal path; and incrementing, by the network switch, the minimal path counter associated with each of the subset of output port.

Example 25 includes the subject matter of any of Examples 23 and 24, and further including determining, by the network switch, whether an end of a network traffic path monitoring window has been reached; capturing, by the network switch and upon a determination that the end of the network traffic path monitoring window has been reached, a present value of the minimal path counter associated with each output port; and resetting, by the network switch, each minimal path counter to zero.

Example 26 includes the subject matter of any of Examples 23-25, and wherein adjusting the total congestion value for each of the set of output ports comprises adjusting the total congestion value as a function of the captured present value of the minimal path counter corresponding to each of the set of output ports.

Example 27 includes the subject matter of any of Examples 23-26, and wherein determining whether the end of the network traffic path monitoring window has been reached comprises determining one of a duration of time has elapsed, a maximum number of cycles of one of the one or more processors has been reached, or a maximum number of network packets have been dequeued from one of the plurality of input ports.

Example 28 includes the subject matter of any of Examples 23-27, and wherein adjusting the total congestion value for each of the set of output ports comprises (i) determining a network traffic pattern for each of the set of output ports, (ii) characterizing each network traffic pattern as a uniform random network traffic pattern type or a static permutation network traffic pattern type, and (ii) adjusting the total congestion value for each of the set of output ports based on the type of network traffic pattern.

Example 29 includes the subject matter of any of Examples 23-28, and wherein the network traffic pattern comprises the uniform random network traffic pattern type for a non-minimal path output port or the static permutation network traffic pattern type for a minimal path output port.

Example 30 includes the subject matter of any of Examples 23-29, and wherein determining whether the network traffic pattern is characterized as the uniform random network traffic pattern type for one of the set of output ports comprises (i) determining whether the minimal path counter corresponding to the one of the set of output ports is greater than a predetermined threshold and (ii) determining whether a present congestion value corresponding to the one of the set of output ports is greater than or equal to half of a maximum congestion threshold.

Example 31 includes the subject matter of any of Examples 23-30, and wherein determining whether the network traffic pattern is characterized as the static permutation network traffic pattern type for one of the set of output ports comprises (i) determining whether the minimal path counter corresponding to the one of the set of output ports is greater than a predetermined threshold and (ii) determining whether a present congestion value corresponding to the one of the set of output ports is equal to a maximum congestion threshold.

Example 32 includes the subject matter of any of Examples 23-31, and wherein adjusting the total congestion value for one of the set of output ports based on the type of network traffic pattern comprises setting the total congestion value for the one of the set of output ports to a value sufficient to exceed a default minimum path bias upon a determination that the output port corresponds to a minimal path and the network traffic pattern is characterized as the static permutation network traffic pattern type.

Example 33 includes the subject matter of any of Examples 23-32, and wherein adjusting the total congestion value for one of the set of output ports based on the type of network traffic pattern comprises setting the total congestion value for the one of the set of output ports to a value equal to a default minimum path bias upon a determination that the output port corresponds to a non-minimal path and the network traffic pattern is characterized as the uniform random network traffic pattern type.

Example 34 includes a network switch comprising a processor; and a memory having stored therein a plurality of instructions that when executed by the processor cause the network switch to perform the method of any of Examples 23-33.

Example 35 includes one or more machine readable storage media comprising a plurality of instructions stored thereon that in response to being executed result in a network switch performing the method of any of Examples 23-33.

Example 36 includes a network switch for adaptive routing based on network traffic pattern characterization, the network switch comprising a buffer queue management circuit to receive a network packet via one of a plurality of input ports of the network switch communicatively coupled to a plurality of output ports of the network switch; means for identifying a set of the plurality of output ports, wherein each of the set of output ports correspond to a path usable to forward the received network packet to a destination computing device; and means for adjusting a total congestion value for each of the set of output ports based on a type of the path to which each of the set of output ports corresponds and a value of a minimal path counter to which each of the set of output ports corresponds, wherein the type of the path comprises one of a minimal path or a non-minimal path, wherein the buffer queue management circuit is further to enqueue the received network packet into an output buffer queue of one of the set of output ports based on the total congestion value.

Example 37 includes the subject matter of Example 36, and further comprising means for identifying a subset of the set of output ports, wherein each of the subset of output ports corresponds to a minimal path; and means for incrementing the minimal path counter associated with each of the subset of output port.

Example 38 includes the subject matter of any of Examples 36 and 37, and further including means for determining whether an end of a network traffic path monitoring window has been reached; means for capturing, upon a determination that the end of the network traffic path monitoring window has been reached, a present value of the minimal path counter associated with each output port; and means for resetting each minimal path counter to zero.

Example 39 includes the subject matter of any of Examples 36-38, and wherein the means for adjusting the total congestion value for each of the set of output ports comprises means for adjusting the total congestion value as a function of the captured present value of the minimal path counter corresponding to each of the set of output ports.

Example 40 includes the subject matter of any of Examples 36-39, and wherein the means for determining whether the end of the network traffic path monitoring window has been reached comprises means for determining one of a duration of time has elapsed, a maximum number of cycles of one of the one or more processors has been reached, or a maximum number of network packets have been dequeued from one of the plurality of input ports.

Example 41 includes the subject matter of any of Examples 36-40, and wherein the means for adjusting the total congestion value for each of the set of output ports comprises means for (i) determining a network traffic pattern for each of the set of output ports, (ii) characterizing each network traffic pattern as a uniform random network traffic pattern type or a static permutation network traffic pattern type, and (ii) adjusting the total congestion value for each of the set of output ports based on the type of network traffic pattern.

Example 42 includes the subject matter of any of Examples 36-41, and wherein the network traffic pattern comprises the uniform random network traffic pattern type for a non-minimal path output port or the static permutation network traffic pattern type for a minimal path output port.

Example 43 includes the subject matter of any of Examples 36-42, and wherein the means for determining whether the network traffic pattern is characterized as the uniform random network traffic pattern type for one of the set of output ports comprises means for (i) determining whether the minimal path counter corresponding to the one of the set of output ports is greater than a predetermined threshold and (ii) determining whether a present congestion value corresponding to the one of the set of output ports is greater than or equal to half of a maximum congestion threshold.

Example 44 includes the subject matter of any of Examples 36-43, and wherein the means for determining whether the network traffic pattern is characterized as the static permutation network traffic pattern type for one of the set of output ports comprises means for (i) determining whether the minimal path counter corresponding to the one of the set of output ports is greater than a predetermined threshold and (ii) determining whether a present congestion value corresponding to the one of the set of output ports is equal to a maximum congestion threshold.

Example 45 includes the subject matter of any of Examples 36-44, and wherein the means for adjusting the total congestion value for one of the set of output ports based on the type of network traffic pattern comprises means for setting the total congestion value for the one of the set of output ports to a value sufficient to exceed a default minimum path bias upon a determination that the output port corresponds to a minimal path and the network traffic pattern is characterized as the static permutation network traffic pattern type.

Example 46 includes the subject matter of any of Examples 36-45, and wherein the means for adjusting the total congestion value for one of the set of output ports based on the type of network traffic pattern comprises means for setting the total congestion value for the one of the set of output ports to a value equal to a default minimum path bias upon a determination that the output port corresponds to a non-minimal path and the network traffic pattern is characterized as the uniform random network traffic pattern type.

The invention claimed is:

1. A network switch for adaptive routing based on network traffic pattern characterization, the network switch comprising:
a plurality of input ports communicatively coupled to a plurality of output ports; and
a pipeline logic circuitry to:
receive a network packet via one of the plurality of input ports of the network switch;
identify a set of the plurality of output ports, wherein each of the set of output ports correspond to a path usable to forward the received network packet to a destination computing device;
adjust a total congestion value for each of the set of output ports based on a type of the path to which each of the set of output ports corresponds and a value of a minimal path counter to which each of the set of output ports corresponds, wherein the type of the path comprises one of a minimal path or a non-minimal path; and
enqueue the received network packet into an output buffer queue of one of the set of output ports based on the total congestion value.

2. The network switch of claim 1, wherein the pipeline logic circuitry is further to:
identify a subset of the set of output ports, wherein each of the subset of output ports corresponds to a minimal path; and
increment the minimal path counter associated with each of the subset of output port.

3. The network switch of claim 1, wherein pipeline logic circuitry is further to:
determine whether an end of a network traffic path monitoring window has been reached;
capture, upon a determination that the end of the network traffic path monitoring window has been reached, a present value of the minimal path counter associated with each output port; and
reset each minimal path counter to zero.

4. The network switch of claim 3, wherein to adjust the total congestion value for each of the set of output ports comprises to adjust the total congestion value as a function of the captured present value of the minimal path counter corresponding to each of the set of output ports.

5. The network switch of claim 3, wherein to determine whether the end of the network traffic path monitoring window has been reached comprises to determine one of a duration of time has elapsed, a maximum number of cycles of one of the one or more processors has been reached, or a maximum number of network packets have been dequeued from one of the plurality of input ports.

6. The network switch of claim 1, wherein to adjust the total congestion value for each of the set of output ports comprises to (i) determine a network traffic pattern for each of the set of output ports, (ii) characterize each network traffic pattern as a uniform random network traffic pattern type or a static permutation network traffic pattern type, and (iii) adjust the total congestion value for each of the set of output ports based on the type of network traffic pattern.

7. The network switch of claim 6, wherein the network traffic pattern comprises the uniform random network traffic pattern type for a non-minimal path output port or the static permutation network traffic pattern type for a minimal path output port.

8. The network switch of claim 6, wherein to determine whether the network traffic pattern is characterized as the uniform random network traffic pattern type for one of the set of output ports comprises to (i) determine whether the minimal path counter corresponding to the one of the set of output ports is greater than a predetermined threshold and (ii) determine whether a present congestion value corresponding to the one of the set of output ports is greater than or equal to half of a maximum congestion threshold.

9. The network switch of claim 6, wherein to determine whether the network traffic pattern is characterized as the static permutation network traffic pattern type for one of the set of output ports comprises to (i) determine whether the minimal path counter corresponding to the one of the set of output ports is greater than a predetermined threshold and (ii) determine whether a present congestion value corresponding to the one of the set of output ports is equal to a maximum congestion threshold.

10. The network switch of claim 6, wherein to adjust the total congestion value for one of the set of output ports based on the type of network traffic pattern comprises to set the total congestion value for the one of the set of output ports to a value sufficient to exceed a default minimum path bias upon a determination that the output port corresponds to a minimal path and the network traffic pattern is characterized as the static permutation network traffic pattern type.

11. The network switch of claim 6, wherein to adjust the total congestion value for one of the set of output ports based on the type of network traffic pattern comprises to set the total congestion value for the one of the set of output ports to a value equal to a default minimum path bias upon a determination that the output port corresponds to a non-minimal path and the network traffic pattern is characterized as the uniform random network traffic pattern type.

12. One or more non-transitory, computer-readable storage media comprising a plurality of instructions stored thereon that in response to being executed cause a network switch to:
receive a network packet via one of a plurality of input ports of the network switch communicatively coupled to a plurality of output ports of the network switch;
identify a set of the plurality of output ports, wherein each of the set of output ports correspond to a path usable to forward the received network packet to a destination computing device;
adjust a total congestion value for each of the set of output ports based on a type of the path to which each of the set of output ports corresponds and a value of a minimal path counter to which each of the set of output ports corresponds, wherein the type of the path comprises one of a minimal path or a non-minimal path; and
enqueue the received network packet into an output buffer queue of one of the set of output ports based on the total congestion value.

13. The one or more non-transitory, computer-readable storage media of claim 12, wherein the plurality of instructions further cause the network switch to:
identify a subset of the set of output ports, wherein each of the subset of output ports corresponds to a minimal path; and
increment the minimal path counter associated with each of the subset of output port.

14. The one or more non-transitory, computer-readable storage media of claim 12, wherein the plurality of instructions further cause the network switch to:
determine whether an end of a network traffic path monitoring window has been reached;

capture, upon a determination that the end of the network traffic path monitoring window has been reached, a present value of the minimal path counter associated with each output port; and reset each minimal path counter to zero.

15. The one or more non-transitory, computer-readable storage media of claim 14, wherein to adjust the total congestion value for each of the set of output ports comprises to adjust the total congestion value as a function of the captured present value of the minimal path counter corresponding to each of the set of output ports.

16. The one or more non-transitory, computer-readable storage media of claim 14, wherein to determine whether the end of the network traffic path monitoring window has been reached comprises to determine one of a duration of time has elapsed, a maximum number of cycles of one of the one or more processors has been reached, or a maximum number of network packets have been dequeued from one of the plurality of input ports.

17. The one or more non-transitory, computer-readable storage media of claim 12, wherein to adjust the total congestion value for each of the set of output ports comprises to (i) determine a network traffic pattern for each of the set of output ports, (ii) characterize each network traffic pattern as a uniform random network traffic pattern type or a static permutation network traffic pattern type, and (iii) adjust the total congestion value for each of the set of output ports based on the type of network traffic pattern.

18. The one or more non-transitory, computer-readable storage media of claim 17, wherein the network traffic pattern comprises the uniform random network traffic pattern type for a non-minimal path output port or the static permutation network traffic pattern type for a minimal path output port.

19. The one or more non-transitory, computer-readable storage media of claim 17, wherein to determine whether the network traffic pattern is characterized as the uniform random network traffic pattern type for one of the set of output ports comprises to (i) determine whether the minimal path counter corresponding to the one of the set of output ports is greater than a predetermined threshold and (ii) determine whether a present congestion value corresponding to the one of the set of output ports is greater than or equal to half of a maximum congestion threshold.

20. The one or more non-transitory, computer-readable storage media of claim 17, wherein to determine whether the network traffic pattern is characterized as the static permutation network traffic pattern type for one of the set of output ports comprises to (i) determine whether the minimal path counter corresponding to the one of the set of output ports is greater than a predetermined threshold and (ii) determine whether a present congestion value corresponding to the one of the set of output ports is equal to a maximum congestion threshold.

21. The one or more non-transitory, computer-readable storage media of claim 17, wherein to adjust the total congestion value for one of the set of output ports based on the type of network traffic pattern comprises to set the total congestion value for the one of the set of output ports to a value sufficient to exceed a default minimum path bias upon a determination that the output port corresponds to a minimal path and the network traffic pattern is characterized as the static permutation network traffic pattern type.

22. The one or more non-transitory, computer-readable storage media of claim 17, wherein to adjust the total congestion value for one of the set of output ports based on the type of network traffic pattern comprises to set the total congestion value for the one of the set of output ports to a value equal to a default minimum path bias upon a determination that the output port corresponds to a non-minimal path and the network traffic pattern is characterized as the uniform random network traffic pattern type.

23. A network switch for adaptive routing based on network traffic pattern characterization, the network switch comprising:
a buffer queue management circuit to receive a network packet via one of a plurality of input ports of the network switch communicatively coupled to a plurality of output ports of the network switch;
circuitry for identifying a set of the plurality of output ports, wherein each of the set of output ports correspond to a path usable to forward the received network packet to a destination computing device; and
circuitry for adjusting a total congestion value for each of the set of output ports based on a type of the path to which each of the set of output ports corresponds and a value of a minimal path counter to which each of the set of output ports corresponds, wherein the type of the path comprises one of a minimal path or a non-minimal path,
wherein the buffer queue management circuit is further to enqueue the received network packet into an output buffer queue of one of the set of output ports based on the total congestion value.

24. The network switch of claim 23, further comprising:
circuitry for identifying a subset of the set of output ports, wherein each of the subset of output ports corresponds to a minimal path; and
circuitry for incrementing the minimal path counter associated with each of the subset of output port.

25. The network switch of claim 23, further comprising:
circuitry for determining whether an end of a network traffic path monitoring window has been reached;
circuitry for capturing, upon a determination that the end of the network traffic path monitoring window has been reached, a present value of the minimal path counter associated with each output port; and
circuitry for resetting each minimal path counter to zero.

* * * * *